Aug. 16, 1966  A. F. HUNDERTMARK ETAL  3,266,618
CONVEYOR FOR DECELERATING TRAVELING PRODUCTS
Filed March 8, 1965
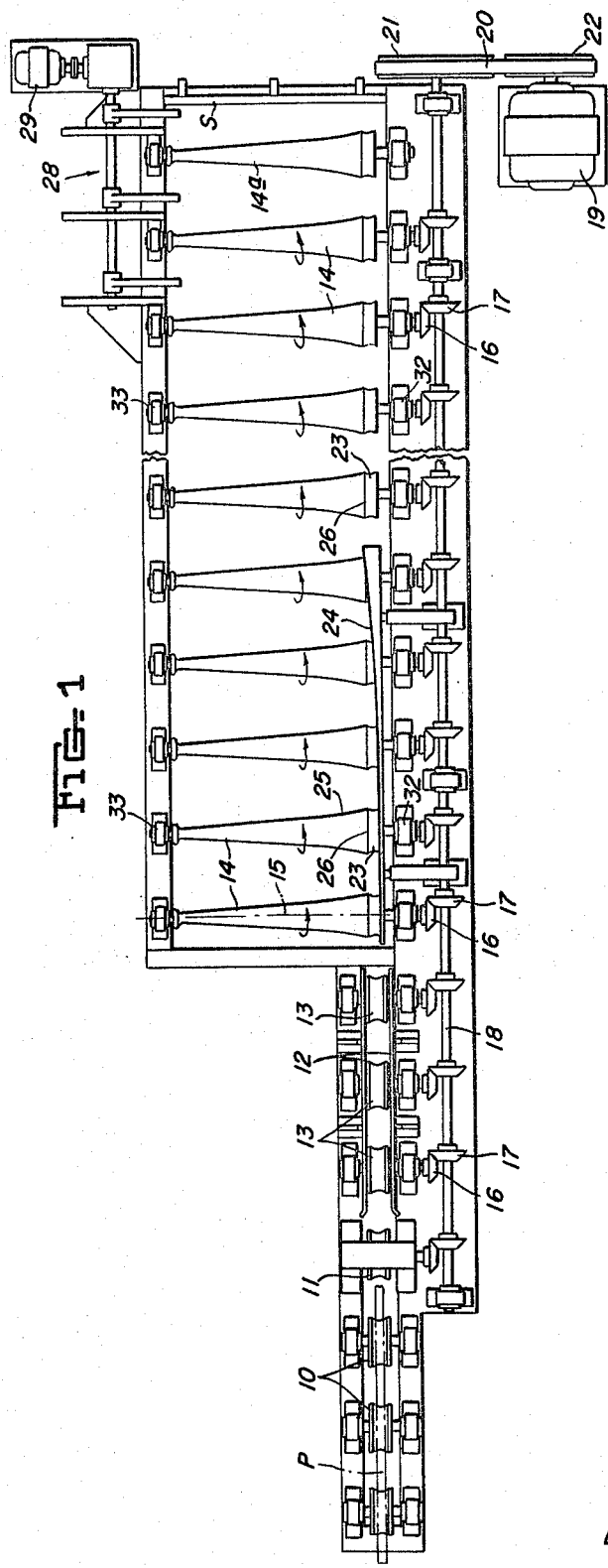
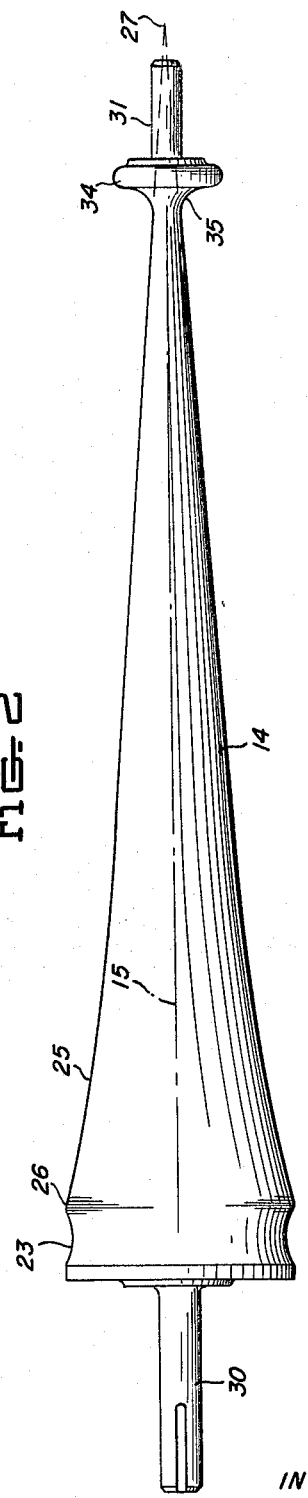
INVENTORS
ALVIN F. HUNDERTMARK and
JAMES R. LAMBERTON
By Donald G. Dalton
Attorney United States Patent Office
3,266,618
Patented August 16, 1966

3,266,618
CONVEYOR FOR DECELERATING TRAVELING PRODUCTS
Alvin F. Hundertmark, Glenshaw, and James R. Lamberton, Pittsburgh, Pa., assignors to United States Steel Corporation, a corporation of Delaware
Filed Mar. 8, 1965, Ser. No. 437,995
2 Claims. (Cl. 198—127)

This invention relates to take-off and carry-away conveyors for decelerating elongated, traveling products. More particularly, the invention relates to conveyors for decelerating elongated workpieces of circular section while moving them sidewise from a delivered axial path.

In the manufacture of steel pipe, rounds and the like in high-speed mills, the cut lengths are delivered axially along a predetermined path. The lengths are successively discharged sidewise from this path and usually brought to a stop or decelerated for further handling by frictional contact with supporting apron plates. During this operation, the retarding force is that of kinetic or sliding friction between the workpiece and the plate surface. Consequently, a skidding surface of great length is required where the speed of the workpiece is on the order of 1,000 feet per minute or more. Where the workpiece is hot, e.g., at about 1600° F., it is subject to longitudinal scratching or gouging by the sliding contact with the particles of scale or other debris that may adhere to the supporting surface.

It is an object of our invention, therefore, to provide improved decelerating apparatus which overcomes the above disadvantages.

A more-specific object is to provide a conveyor for elongated workpieces of circular section delivered axially along a predetermined path, comprising a plurality of generally horizontal conveyor rolls spaced along one side of the path and having their axes extending laterally thereof.

In a preferred embodiment, we provide means to move a workpiece on the rolls laterally or sidewise of the path. We drive the rolls at a peripheral speed substantially the same as the axial speed of the workpiece in said path just prior to said lateral movement. The rolls have a concave surface of revolution, the radii of which decrease with the distance from said path along their axes, whereby a workpiece rolls down along said surfaces and maintains static friction therewith as it decelerates. We have found that this static frictional force results in appreciably greater deceleration than is obtainable with a stationary, smooth surface. The maintenance of a static frictional force necessitates that the axial speed of a workpiece be about the same as the peripheral speed of the rolls.

One form of apparatus as outlined above is shown in the accompanying drawings, in which:

FIGURE 1 is a plan view showing the conveyor rolls of invention and means for deflecting a workpiece laterally from an axial delivery path onto the surface of the rolls which have a special shape; and FIGURE 2 is an enlarged view of a conveyor roll.

As shown in FIGURE 1, a pipe length P is delivered from processing apparatus (not shown) along an axial path on longitudinally spaced idler conveyor rolls 10, which may also be driven. The pipe length is delivered between a pair of conventional pinch rolls 11 and transversely spaced guides 12 over a plurality of longitudinally spaced driven rolls 13 to a plurality of longitudinally spaced driven rolls 14, the axes 15 thereof being substantially normal to the axial path of the pipe length. Rolls 11, 13 and 14 are driven in the same direction by bevel gears 16 mounted on their respective shafts and mating with bevel gears 17 mounted on a longitudinal shaft 18. A motor 19 rotates shaft 18 through a belt 20 connecting pulleys 21, 22 mounted respectively on shaft 18 and motor 19. Other conventional roll-drive means may be used.

The pipe length P, delivered axially to grooves 23 on rolls 14, is moved laterally by a deflector plate 24 or other conventional deflecting means onto the contoured portions 25 of rolls 14. As shown in FIGURE 2, the contour may extend from a point 26 to a point 27 on roll axis 15. Point 26 represents the point of initial free lateral descent down the contoured section of the roll after the pipe has been moved sidewise from groove 23.

According to the invention, the axial speed of pipe length P should be substantially equivalent to the peripheral speed of rolls 14 at grooves 23 and immediately adjacent thereto at point 26, thereby establishing a condition of static friction between rolls and pipe length. As the pipe length rolls laterally or sidewise by gravity downwardly on the rolls, the contour 25 is such that substantial equivalence of longitudinal speed of pipe and peripheral speed of rolls is maintained; hence static friction is maintained and the axial speed of the pipe decreases progressively by action of the retarding frictional force. The pipe lengths may be stopped or decelerated for further handling when they have rolled to the small-diameter ends of the rolls. It has been found that by means of our invention the overall stopping distance may be up to about 20% less than for a conventional skidding plate. As shown in FIGURE 1, the last roll 14a in the conveyor is an idler roll. Adjacent thereto is a stop plate S to stop the pipe lengths P. A decelerated pipe length P may be transferred to storage or other conveyor means, not shown, by a conventional kick-out means 28, reciprocated by a motor 29.

As shown in FIGURE 2, a conveyor roll 14 has shafts 30, 31 on the extremities thereof that are journaled in bearings 32, 33, respectively, mounted on the conveyor frame. As described hereinabove, the roll contour may extend between points 26 and 27. It has been found, however, that for more efficient mounting by means of shaft 31, the length of the roll contour may be decreased and terminate in a flange 34. The decelerated pipe length may be transferred to the kick-out means 28 in an arcuate portion 35 connecting contour 25 and flange 34. The length of a roll contour is preferably chosen to decelerate the product as much as possible with a structurally strong roll that may be simply supported, for example, with a shaft and bearing at each end.

The critical contour of the rolls between points 26 and 27 is defined in accordance with the following relationship or equation:

$$r = r_0 - \frac{fz}{W} \sqrt[3]{\frac{9gW}{4fz}}$$

where $r=$ radius in inches of the contour surface at any plane along axis 15, normal thereto $r_0=$ radius in inches of the contour surface at the plane of initial lateral movement of a workpiece immediately adjacent its delivery path at point 26 where $z=0$ $f=$ coefficient of static friction between workpiece and roll $z=$ roll axis 15 in inches $W=$ angular velocity of a roll in radians per second $g=$ acceleration due to gravity In the above equation, the values of $f$ and $g$ are independent of the axial speed of a workpiece. These values and the maximum axial speed of the delivered workpiece must be known. The contour may then be found by establishing any one of the following three values:

(1) $r_0$, the radius of the roll at the plane of initial lateral movement of a workpiece, namely, at point 26 where $z=0$
(2) W, the angular velocity of the roll
(3) $z$ at $r=0$, the total length of a roll along axis 15

The contour developed from the equation is effective only when the axes of the rolls are horizontal. In addition, the contour developed from the above equation is effective for all pipe for which the radius of gyration is approximately equal to the outside radius of the pipe. For very heavy-wall, small-diameter pipe and for solid rounds, the second term on the right-hand side of the equation is multiplied by a constant to account for the inequality. The constant is:

$$\sqrt[3]{\frac{R^2+k^2}{2R^2}}$$

where $R=$ radius in inches to the outside of a workpiece
$k=$ polar radius of gyration inches For a solid round or cylinder where $k^2=0.5R^2$, the constant is 0.91. The consequent change to a contour for handling solid rounds is relatively small. The roll length is increased by about 15%.

A complete understanding of the invention may be obtained from the following example.

A conveyor constructed as shown in FIGURES 1 and 2 had carbon steel rolls 14 therein. The contours 25 thereof were developed in accordance with the above equation. The horizontal roll axes 15 were mounted normal to the axial delivery path and spaced about 8 inches apart. The rolls were constructed to transfer pipe lengths delivered thereto at a maximum axial speed of about 1,000 feet per minute and at a temperature of about 1600° F. A value of 2 inches for $r_0$ was chosen, which established the peripheral speed at point 26 as 952 r.p.m., giving W a value of 100 radians per second. This also established $z$ as 21.4 inches at $r=0$. However, as shown in FIGURE 2, where arcuate portion 35 was tangent to contour 25, $z$ was 18 inches, the roll diameter being 0.48 inch. At the opposite end of the rolls, the centerline of grooves 23 was about ⅝ inch from point 26, the roll diameters at the centerline being about 4 inches. The static coefficient of friction ($f$) for carbon steel at 1600° F. in contact with carbon steel at room temperature is 0.45.

Standard 1½ inch carbon steel pipe, cut to lengths of about 38 inches and heated to about 1600° F., were delivered to the conveyor on rolls 10. In passing through pinch rolls 11, which were employed only as means for establishing the speed of the workpiece, the axial speed of each length was established at about 1,000 feet per minute, which was the peripheral speed of rolls 14 at grooves 23 and point 26. A deflector plate 24 deflected each length laterally. In their descent down roll contours 25, the axial speed of the pipe lengths decreased rapidly until received in arcuate portions 35, where the axial speed had been reduced to about 120 feet per minute and the lengths could be handled easily by kick-out means 28. The average longitudinal distance of pipe travel between lateral deflection and reception in arcuate portions 35 was about 9.4 feet. For comparison, to determine the difference in results obtained when decelerating with static friction and kinetic or sliding friction, the above tests were repeated except that rolls 14 were held stationary. The average longitudinal distance of pipe travel between lateral deflection and reception in arcuate portions 35 was about 10.8 feet, an average increase of about 15% as compared to the preferred static friction deceleration.

While the above example illustrates a preferred apparatus and method of operation, other changes in apparatus or its operation may be effected without departing from the spirit of the invention. In the example, hot carbon steel pipe was used. The workpiece handled by our conveyor may be hot or cold pipe or solid rounds of any material. Likewise, the conveyor rolls may be of steel or other materials. The rolls may be coated or have replaceable shells thereon to increase the coefficient of static friction between roll and workpiece and thereby decrease the roll length where other conditions remain substantially the same. While a composite roll is preferred, the grooved portion 23 may be separated from contoured portion 25. The rolls should be designed for maximum roll speed. When operating at lesser speeds, the overall stopping distance of a workpiece will always be less than when operating at design speed. No matter how the workpieces are deflected from their axial path, they should descend the roll surfaces substantially normal to the roll axes.

The invention is characterized by several distinct advantages. In the first place, this conveyor will minimize the occurrence of scratches and gouges, especially on hot workpieces. Secondly, the conveyor moves workpieces laterally of the delivery path from an earlier operation. Lastly, the conveyor decelerates or stops workpieces in the shortest possible distance without need for other expensive mechanical or electrical means requiring frequent maintenance.

Although we have disclosed herein the preferred embodiment of our invention, we intend to cover as well any change or modification therein which may be made without departing from the spirit and scope of the invention.

We claim:

1. A conveyor for elongated workpieces of circular section delivered axially along a predetermined path comprising a plurality of generally horizontal conveyor rolls spaced along one side of said path and having their axes extending laterally thereof, means moving said workpieces laterally from said path and along said rolls, means driving said rolls at a speed such that the surfaces thereof immediately adjacent said path have substantially the same speed as a workpiece, said rolls having a concave surface of revolution, the radii of which decrease with the distance along said axes from said path, whereby a workpiece traveling over said rolls continuously maintains static friction therewith and is decelerated longitudinally by a static frictional force, the contour of said surface being expressed by an equation, where $$r = r_0 - \frac{fz}{W}\sqrt[3]{\frac{9gW}{4fz}}$$

wherein $r=$ radius in inches of a roll contour at any plane along a said roll axis, normal thereto $r_0=$ radius in inches of a roll contour at the plane of initial lateral movement of a said workpiece immediately adjacent said path where $z=0$ $f=$ coefficient of static friction between workpiece and roll $z=$ roll axis in inches between $z=0$ and $r=0$ $W=$ angular velocity of roll in radians per second $g=$ acceleration in inches per second per second due to gravity 2. A conveyor as defined in claim 1 adapted for workpieces wherein the radius of gyration thereof is not substantially equal to the outside radius of said workpieces characterized by multiplying the second term on the right side of said equation by a constant $$\sqrt[3]{\frac{R^2+k^2}{2R^2}}$$

wherein $R$=outside radius of a said workpiece in inches
$k$=polar radius of gyration in inches

References Cited by the Examiner

UNITED STATES PATENTS

| Re. 18,950 | 9/1933 | Edwards | 198—127 |
| 653,506 | 7/1900 | Edwards | 198—127 X |
| 1,587,069 | 6/1926 | Edwards | 198—127 |
| 2,248,657 | 6/1941 | Blondon et al. | 198—127 X |

EVON C. BLUNK, *Primary Examiner.*

R. WALKER, *Assistant Examiner.*